(12) United States Patent
Taya et al.

(10) Patent No.: US 10,072,611 B2
(45) Date of Patent: Sep. 11, 2018

(54) GAS GENERATOR

(71) Applicant: IHI Corporation, Koto-ku (JP)

(72) Inventors: Kohei Taya, Tokyo (JP); Yasuhiro Ishikawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 281 days.

(21) Appl. No.: 15/018,450

(22) Filed: Feb. 8, 2016

(65) Prior Publication Data

US 2016/0153400 A1  Jun. 2, 2016

Related U.S. Application Data

(63) Continuation of application No. PCT/JP2014/071486, filed on Aug. 15, 2014.

(30) Foreign Application Priority Data

Oct. 11, 2013 (JP) ................................. 2013-213725

(51) Int. Cl.
| F02K 9/52 | (2006.01) |
| F02C 7/22 | (2006.01) |
| F02K 9/44 | (2006.01) |
| F02C 3/20 | (2006.01) |
| F02K 9/62 | (2006.01) |

(52) U.S. Cl.
CPC ............ F02K 9/52 (2013.01); F02C 3/20 (2013.01); F02C 7/22 (2013.01); F02C 7/222 (2013.01); F02K 9/44 (2013.01); F02K 9/62 (2013.01)

(58) Field of Classification Search
CPC ..... F02K 9/44; F02K 9/52; F02K 9/62; F02C 27/22; F02C 27/222; F02C 3/20; F02C 7/00

USPC .......................... 431/159, 189, 195, 204, 354
See application file for complete search history.

(56) References Cited

U.S. PATENT DOCUMENTS

| 3,446,024 A | 5/1969 | Lewis et al. |
| 3,603,092 A | 9/1971 | Drexhage |
| 4,525,175 A * | 6/1985 | Stellaccio ................ C10J 3/506 |
| | | 239/132.3 |

(Continued)

FOREIGN PATENT DOCUMENTS

| JP | 62/150060 | 7/1987 |
| JP | 64-19045 U | 1/1989 |

(Continued)

OTHER PUBLICATIONS

Extended European Search Report dated Mar. 1, 2017 in Patent Application No. 14852953.0.

(Continued)

*Primary Examiner* — Steven Sutherland
(74) *Attorney, Agent, or Firm* — Oblon, McClelland, Maier & Neustadt, L.L.P.

(57) ABSTRACT

A gas generator includes an injector that injects a fuel and an oxidizer, and a combustor that mixes and burns the fuel and the oxidizer injected from the injector. The injector includes a plurality of injection elements arranged on a face plate. Each of the injection elements includes unlike-impingement type injection nozzles that inject the fuel and the oxidizer toward a combustion point in front of the face plate, and injection nozzles that inject fuel for dilution to a dilution point DP forward further than the combustion point.

5 Claims, 7 Drawing Sheets

(56) References Cited

U.S. PATENT DOCUMENTS

| | | | | |
|---|---|---|---|---|
| 4,801,092 A | * | 1/1989 | Webber | B05B 7/0807 |
| | | | | 239/418 |
| 4,863,102 A | * | 9/1989 | Levin | B29C 33/52 |
| | | | | 239/135 |
| 6,351,939 B1 | | 3/2002 | Buddenbohm et al. | |

FOREIGN PATENT DOCUMENTS

| | | |
|---|---|---|
| JP | 1-92560 | 4/1989 |
| JP | 6-249070 | 9/1994 |
| JP | 7-49060 | 2/1995 |
| JP | 8-338313 | 12/1996 |
| JP | 2003-35207 | 2/2003 |
| JP | 2012-189014 | 10/2012 |
| JP | 2012-189018 | 10/2012 |
| KR | 2003-0076119 A | 9/2003 |

OTHER PUBLICATIONS

International Search Report dated Nov. 18, 2014 in PCT/JP2014/071486, filed Aug. 15, 2014.
Written Opinion dated Nov. 18, 2014 in PCT/JP2014/071486 filed Aug. 15, 2014.
Howard W. Douglass et al. "Liquid Propellant Gas Generators", Nasa SP-8081, Mar. 1972, 111 Pages.

* cited by examiner

GAS GENERATOR

CROSS REFERENCE TO RELATED APPLICATIONS

This application is a continuation application of International Application No. PCT/JP2014/071486, filed on Aug. 15, 2014, which claims priority to Japanese Patent Application No. 2013-213725, filed on Oct. 11, 2013, the entire contents of which are incorporated by reference herein.

BACKGROUND

1. Technical Field

The present disclosure relates to a gas generator that mixes and burns a fuel and an oxidizer.

2. Description of the Related Art

In a rocket engine, a fuel and an oxidizer are each pressurized by a turbopump, and are supplied to a main combustion chamber. At this time, a part of the fuel and the oxidizer is introduced into a gas generator and is burned, and the resulting combustion gas is supplied as a turbine driving fluid for each of the turbopumps for fuel and oxidizer.

The combustion gas supplied from the gas generator to the turbopumps is required to have low temperatures from the viewpoint of durability of turbines of the turbopumps. Therefore, in the gas generator, the temperature of the combustion gas is suppressed by burning the fuel and the oxidizer at a mixture ratio in which the fuel is excessive.

Here, the mixture ratio between a fuel and an oxidizer represents a value obtained by dividing the mass flow rate of the oxidizer by the mass flow rate of the fuel. In the case where the mixture ratio falls outside an appropriate range to be in a state of an excess fuel amount, the mixture ratio becomes a low mixture ratio (fuel rich), whereas, in the case where the mixture ratio falls outside an appropriate range to be in a state of an excess oxidizer amount, the mixture ratio becomes a super-high mixture ratio (oxidizer rich).

Note that a state of excess fuel is near a flammable limit and deteriorates ignitability or flame-stability. Accordingly, in order to avoid insufficient combustion-gas output due to non-ignition or anti-inflammation, the mixture ratio is reduced by diluting, with fuel, the combustion gas obtained by combustion of a fuel and an oxidizer at a mixture ratio in an appropriate range, and thus temperature of the combustion gas is reduced (cf. see NASA SP-8081 "LIQUID PROPELLANT GAS GENERATORS" pp. 8-12).

Furthermore, as the gas generator in which the combustion gas obtained through combustion of a fuel and an oxidizer at a mixture ratio falling in an appropriate range is diluted with fuel, there is proposed a gas generator in which a plurality of injection elements each having like-impingement fuel injection nozzles is arranged at a central portion and on an outer peripheral concentric circle of the combustor, and a plurality of injection elements each having like-impingement oxidizer injection nozzle is arranged on a concentric circle between the central portion and the outer peripheral concentric circle (cf. Patent Japanese Patent Laid-Open Publication No. 2012-189014).

In the proposition, there is formed a high-temperature combustion zone in which equal amounts of a fuel and an oxidizer are injected at the central portion of the combustor, and there is formed a low-temperature combustion zone in which a fuel and an oxidizer are injected in a state of being excess fuel at an outer peripheral portion of the combustor.

SUMMARY

With the conventional gas generator described above, it is possible to reduce temperatures of the combustion gas by diluting the combustion gas with the fuel in the low-temperature combustion zone and reducing the mixture ratio, while securing flame-stability in the high-temperature combustion zone, whereby it is possible to stably supply the combustion gas serving as a driving fluid to the turbopump, by achieving both the flame-stability and reduction in the temperature of the combustion gas.

An object of the present disclosure is to provide a gas generator, which is obtained by further improving the conventional gas generator described above to thereby make further uniform a combustion state in a high-temperature combustion zone at a mixture ratio in an appropriate range where ignitability and flame-stability are secured, and a combustion state in a low-temperature combustion zone at a low mixture ratio (fuel rich) or a super-high mixture ratio (oxidizer rich) falling outside the appropriate range, and which can reduce development cost by simply evaluating the combustion states.

A first aspect of the present disclosure is a gas generator, and the gas generator includes: an injector configured to inject a fuel and an oxidizer; and a combustor configured to mix and burn the fuel and the oxidizer injected from the injector, wherein the injector includes a plurality of injection elements arranged on a same plane, and each of the injection elements includes: one or more fuel injection nozzles for combustion and one or more oxidizer injection nozzles for combustion, which mix and burn each jet of the fuel and the oxidizer at a combustion point in front of the plane in the combustor; and one or more injection nozzles for dilution, which mixes a fuel or an oxidizer for dilution injected toward a dilution point located forward further than the combustion point and in front of the plane in the combustor, with a combustion gas generated at the combustion point.

The one or the plurality of fuel injection nozzles for combustion and the one or the plurality of oxidizer injection nozzles for combustion may be unlike-impingement type inject nozzles that cause each jet of the fuel and the oxidizer to impinge with each other at the combustion point. The injection nozzle for dilution may inject the fuel or oxidizer for dilution toward a mixture point existing on an extended line of a spray fan direction of an impingement jet generated as a result of impingement of the jets of the fuel and the oxidizer at the combustion point.

According to the present disclosure, it is possible to make further uniform combustion states in a high-temperature combustion zone at a mixture ratio in an appropriate range where ignitability and flame-stability are secured, and in a low-temperature combustion zone at a low mixture ratio (fuel rich) or a super-high mixture ratio (oxidizer rich) falling outside the appropriate range, and to simply evaluate the states to thereby reduce development cost.

DESCRIPTION OF THE EMBODIMENTS

Figure 1:
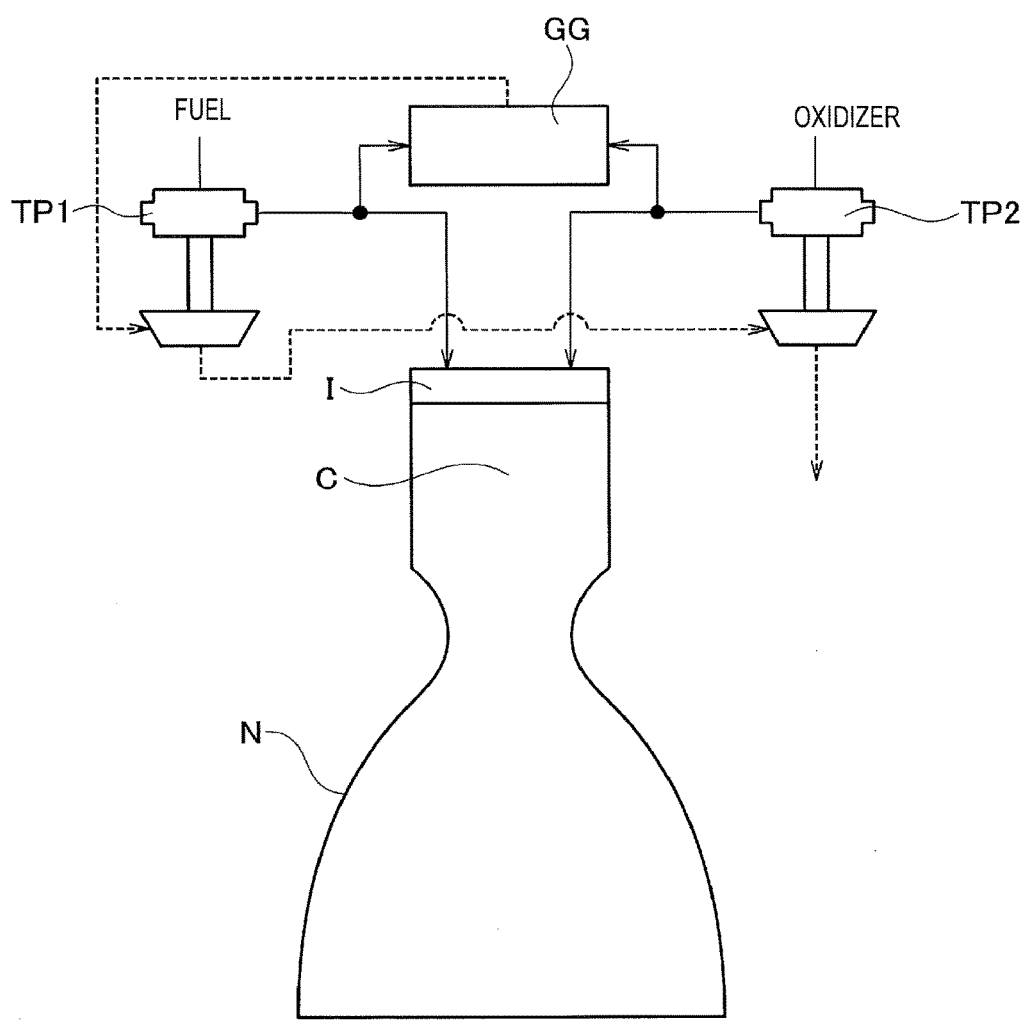
FIG. 1 is an explanatory view illustrating a schematic configuration of a liquid rocket engine to which the present disclosure is applied.

Hereinafter, an embodiment of the present disclosure will be described with reference to the drawings. FIG. 1 is an explanatory view illustrating a schematic configuration of a liquid rocket engine to which the present disclosure is applied.

The liquid rocket engine illustrated in FIG. 1 includes a main combustion chamber C having a main injector I and a nozzle N communicating with the main combustion chamber C. Furthermore, the liquid rocket engine includes a turbopump TP1 for supplying fuel to the main injector I in a pressurized manner, and a turbopump TP2 for supplying oxidizer to the main injector I in a pressurized manner. Note that, for example, liquefied natural gas (LNG: liquefied methane) can be used as the fuel. Moreover, for example, liquefied oxygen (LOX) can be used as the oxidizer. There can be used, as the turbopump, single-shaft turbopump in which a turbopump for fuel and a turbopump for oxidizer are integrated.

Furthermore, the liquid rocket engine includes a gas generator (GG) that takes in a part of a fuel and an oxidizer introduced in the main injector I to mix and burn them. The combustion gas generated by the gas generator (GO) is used as the driving fluid for each of the turbopumps TP1 and TP2.

At this time, in the gas generator (GG), a fuel and an oxidizer are mixed and burned in a state of a low mixture ratio, which is a state of being excess fuel (fuel rich), or in a state of a super-high mixture ratio, which is a state of being excess oxidizer (oxidizer rich), thereby reducing the temperature of the generated combustion gas (for example, at approximately 500° C.), in order not only to protect turbines of the turbopumps TP1 and TP2 from heat, but also to operate the turbines without a risk from the viewpoint of reduction in strength thereof or reduction in operating life thereof.

Figure 2:
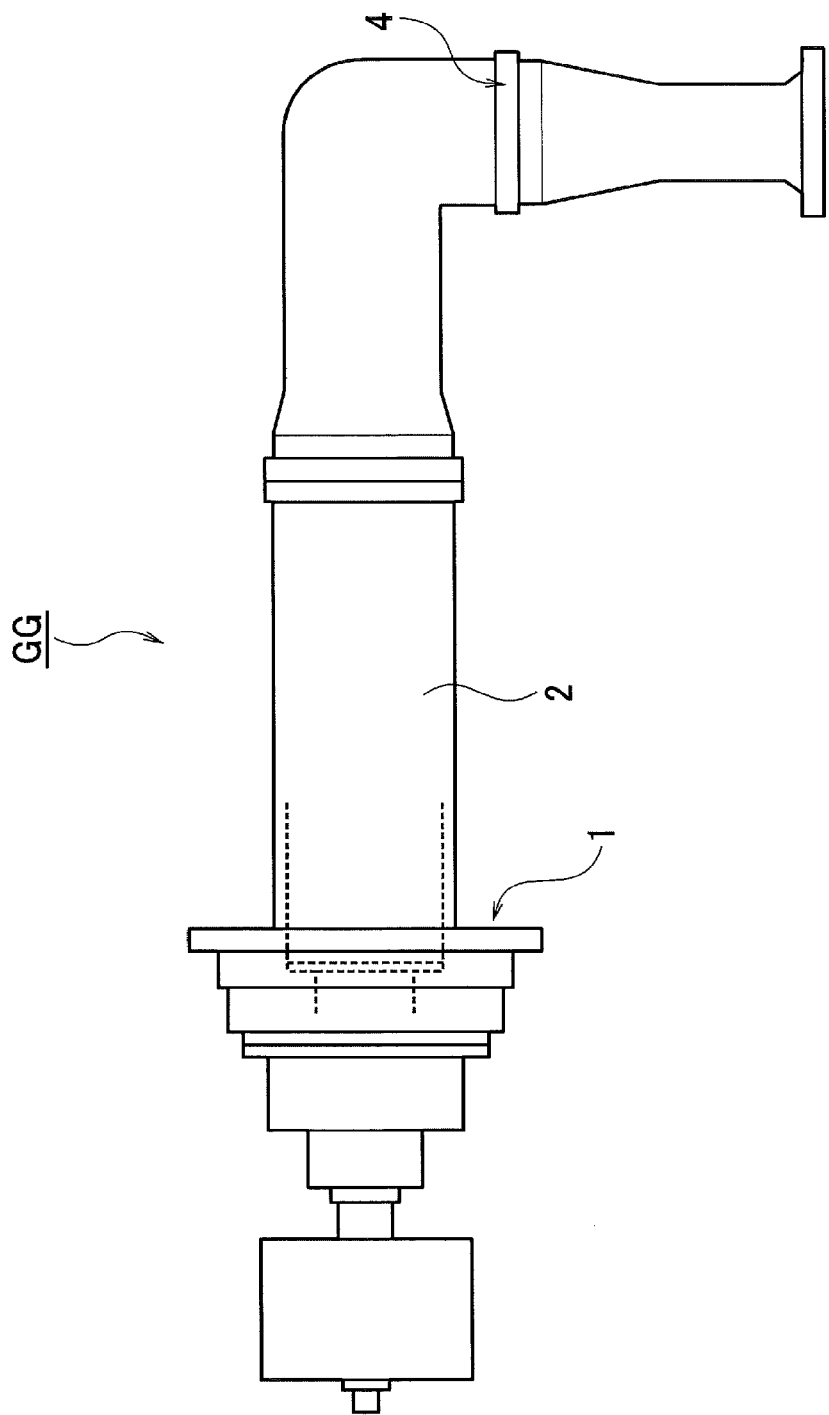
FIG. 2 is an explanatory view illustrating a gas generator according to an embodiment of the present disclosure applied to a liquid rocket engine illustrated in FIG. 1.

As illustrated in the explanatory view in FIG. 2, the gas generator (GG) includes an injector 1 for fuel and oxidizer, and a tubular combustor 2 for mixing and burning the fuel and the oxidizer injected from the injector 1, and a pipe connecting portion 4 for guiding the combustion gas to the turbopumps TP1 and TP2 is continuously provided in the combustor 2.

Figure 3:
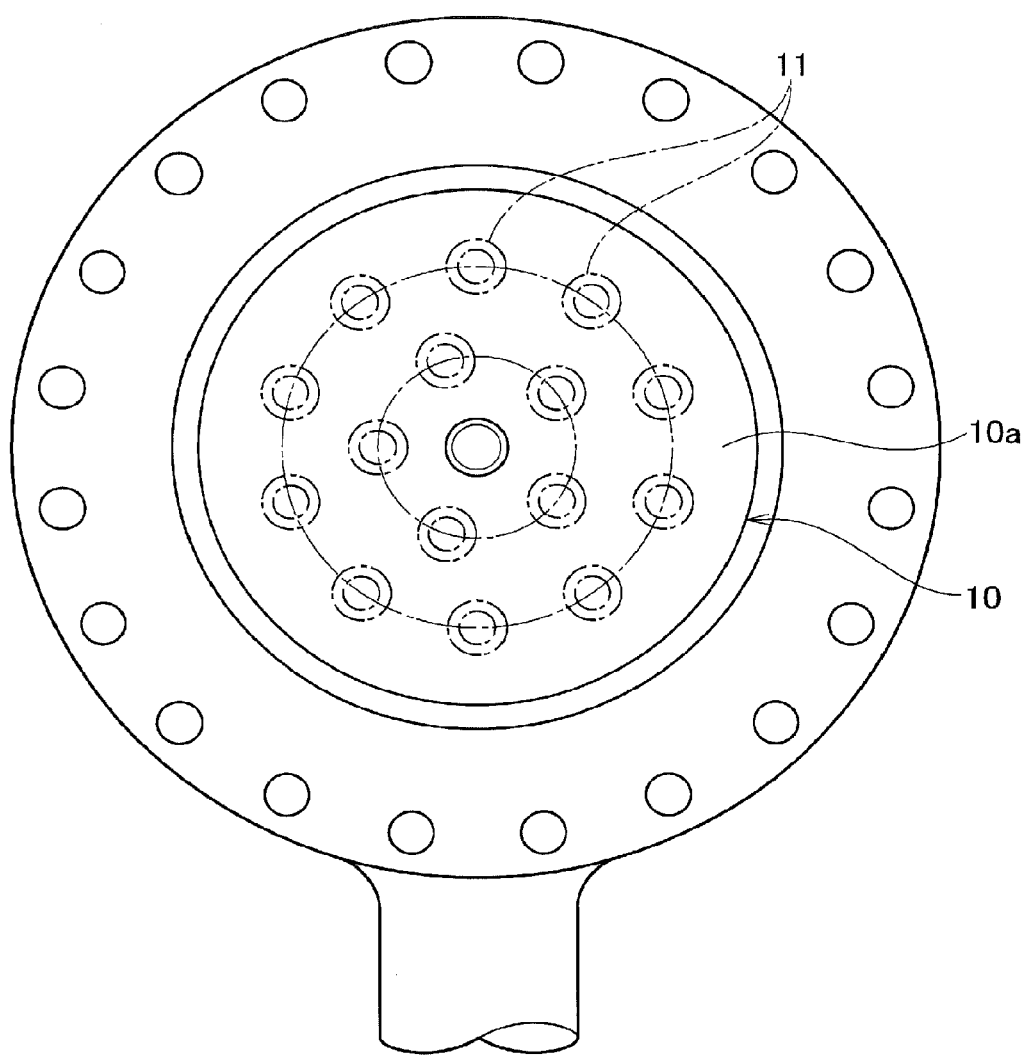
FIG. 3 is an elevation view illustrating an injector in FIG. 2.

As illustrated in the elevation view in FIG. 3, the injector 1 in the gas generator (GG) has a structure in which a plurality of injection elements 11, each having the same structure, are arranged on a surface 10a (the same plane) of a circular face plate 10. In the present embodiment, these injection elements 11 are arranged at intervals on circumferences of concentric circles with the center of the surface 10a of the face plate 10 as the center thereof. Depending on operations, these injection elements 11 may not be necessarily arranged on the circumferences of concentric circles.

In the example illustrated in the explanatory view in FIG. 4A, each of the injection elements 11 includes one oxidizer injection nozzle 13 for combustion (hereinafter, referred to as a first injection nozzle) and three fuel injection nozzles 15 for combustion (hereinafter, referred to as second injection nozzles). The first injection nozzle 13 is arranged at the center of the concentric circles, and the three second injection nozzles 15 are arranged at equal intervals on a smaller circumference of the concentric circles.

Furthermore, in the example illustrated in FIG. 4A, each of the injection elements 11 further includes three injection nozzles for dilution (hereinafter, referred to as third injection nozzles). The three third injection nozzles 17 are arranged at equal intervals on a larger circumference of the concentric circles.

Figure 4A:
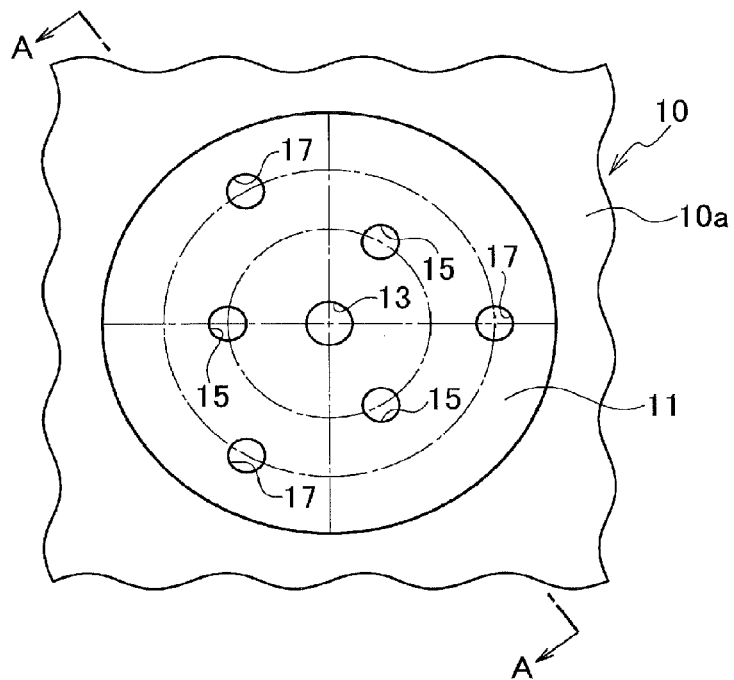
FIG. 4A is an enlarged elevation view illustrating an injection element in FIG. 3.
Figure 4B:
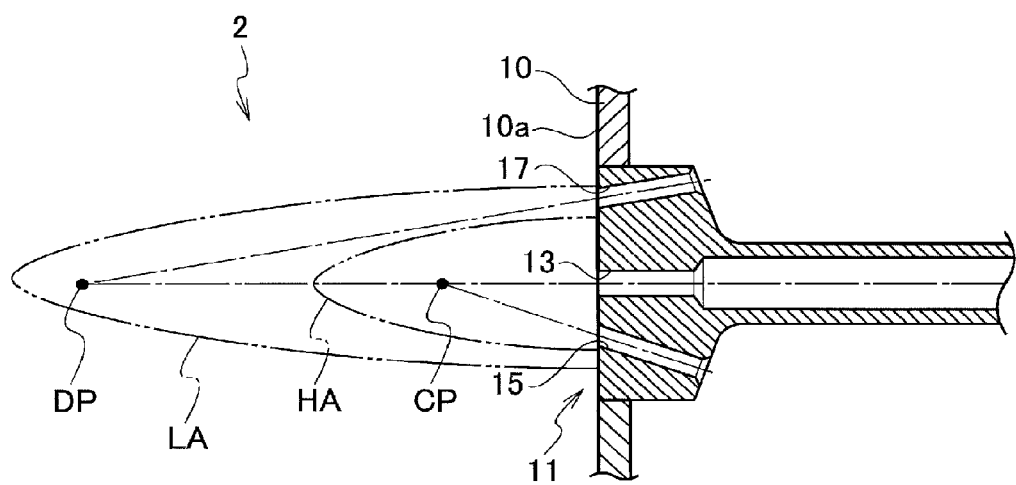
FIG. 4B is a cross-sectional view taken along the A-A line in FIG. 4A.

As illustrated in FIG. 4B, which is a cross-sectional view taken along the A-A line in FIG. 4A, the first injection nozzle 13 injects oxidizer toward the front of the face plate 10. Each of the second injection nozzles 15 injects fuel toward a combustion point CP in the combustor 2. The combustion point CP is positioned on the axial line of injection of the fuel from the first injection nozzle 13.

Therefore, the oxidizer from the first injection nozzle 13 and the fuel from each of the second injection nozzles 15 impinge at the combustion point CP in the combustor 2. Namely, the injection element 11 according to the present embodiment constitutes an unlike-impingement type injector.

Moreover, each of the third injection nozzles 17 injects a fuel or an oxidizer for dilution toward a dilution point DP in the combustor 2. The dilution point DP is located on the axial line of injection of the fuel from the first injection nozzle 13, and is located forward further than the combustion point CP and in front of the face plate 10.

Figure 5A:
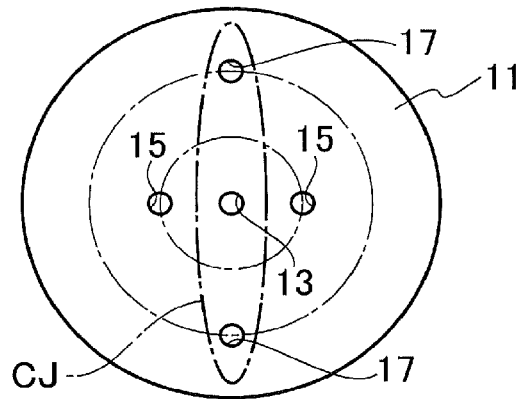
FIGS. 5A to 5C are explanatory views illustrating spray fan of a fuel and an oxidizer, which impinge at a combustion point in FIG. 4A, by numbers and arrangements of oxidizer injection nozzles for combustion.
Figure 5B:
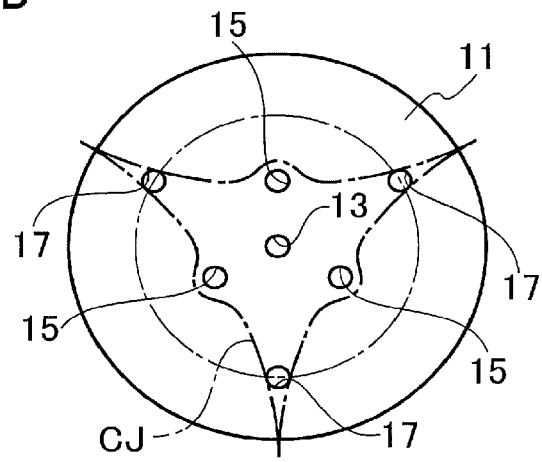
Figure 5C:
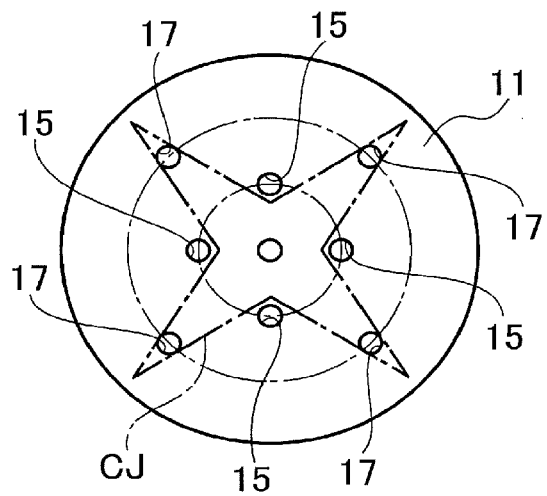

Here, as illustrated in the explanatory views in FIGS. 5A to 5C, the oxidizer from the first injection nozzle 13 and the fuel from each of the second injection nozzles 15, which have impinged at the combustion point CP, are mixed with each other to be an impingement jet CJ. The direction of the impingement jet CJ sprayed from the combustion point CP is determined according to injection directions or injection speeds of oxidizer and fuel from the first injection nozzle 13 and the second injection nozzles 15.

The impingement jet CJ is a gas having a high mixture ratio in which a fuel and an oxidizer are mixed at a higher ratio than the entire mixture ratio, and is ignited to serve as a combustion gas. With these operations, a high-temperature combustion zone HA (see FIG. 4B) surrounding the impingement jet CJ is formed in the vicinity of the combustion point CP.

Note that FIG. 5A illustrates a case where two second injection nozzles 15 are provided in each of the injection elements 11, FIG. 5B illustrates a case where three second injection nozzles 15 are provided, and FIG. 5C illustrates a case where four second injection nozzles 15 are provided. In each of the cases described above, the second injection nozzles 15 are arranged at equal intervals in the circumferential direction.

As is clear from FIGS. 5A to 5C, the impingement jet CJ has strong directivity, in a direction extending in the radial direction of a circumference on which the second injection nozzles 15 are arranged, and in a direction toward the middle point between two second injection nozzles 15 adjacent on the circumference from the first injection nozzle 13. Namely, the direction of the strong directivity (the number of directivities) of the impingement jet CJ varies depending on the number (arrangement) of the second injection nozzles 15.

Therefore, as illustrated in FIGS. 5A to 5C, the third injection nozzles 17 are provided in each of the injection elements 11, corresponding to respective second injection nozzles 15, and are each arranged on a line extending in the direction of each of the strong directivities of the impingement jet CJ. Note that FIGS. 5A to 5C each illustrate a case where a third injection nozzle 17 is provided, corresponding to a second injection nozzle 15, but it may be possible to provide a plurality of third injection nozzles 17, corresponding to one second injection nozzle 15.

Figure 6:
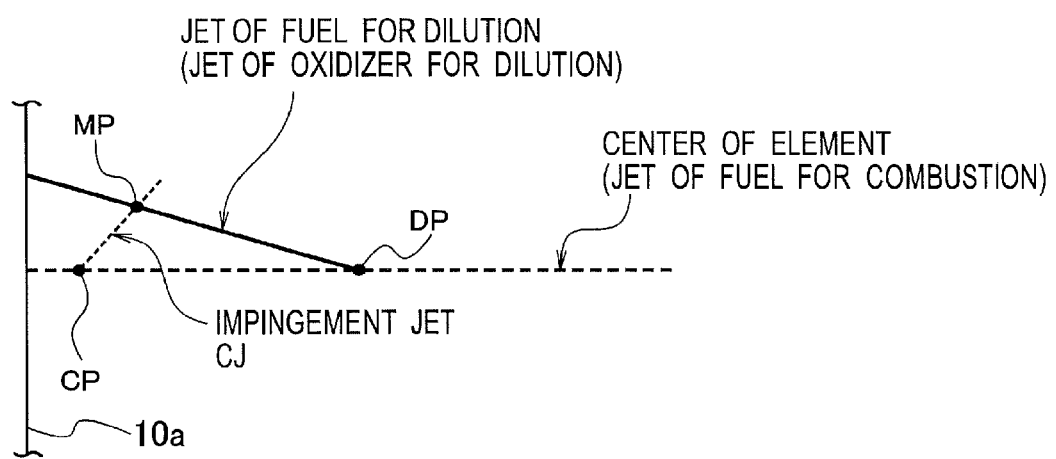
FIG. 6 is an explanatory view illustrating a positional relationship between an impingement jet of a fuel and an oxidizer and a jet of fuel for dilution in the combustor in FIG. 2.

In addition, as illustrated in the explanatory view in FIG. 6, the fuel or oxidizer for dilution, which is injected from each of the third injection nozzles 17 toward the dilution point DP illustrated in FIG. 4B, impinges with the impingement jet CJ at a mixture point MP existing on an extended line of the spray fan direction of the impingement jet CJ. With this impingement, the combustion gas is diluted with the fuel for dilution or oxidizer for dilution to be a low mixture ratio (fuel rich) or a super-high mixture ratio (oxidizer rich), whereby a low-temperature combustion zone LA (see FIG. 4B) is formed in the vicinity of the pipe connecting portion 4.

As described above, in the present embodiment, in each of the plurality of injection elements 11 arranged on the face plate 10 of the injector 1, there are provided: the first injection nozzle and the second injection nozzles 15, which are of unlike-impingement type and which inject oxidizer and fuel to the combustion point CP located in front of the face plate 10; and the third injection nozzles 17 that inject a fuel or an oxidizer for dilution toward the dilution point DP forward further than the combustion point CP.

Furthermore, a configuration is such that: the fuel and the oxidizer are burned in the high-temperature combustion zone HA in the vicinity of the combustion point CP at a mixture ratio in an appropriate range where ignitability and flame-stability are secured; the high-temperature combustion gas generated through the burning is diluted with the fuel for dilution or oxidizer for dilution; and then, the combustion gas is burned in the low-temperature combustion zone LA in the vicinity of the pipe connecting portion 4, in a state of being at a low mixture ratio (fuel rich) or a super-high mixture ratio (oxidizer rich), whereby temperatures thereof are reduced.

Therefore, the combustion state in the high-temperature combustion zone HA and the combustion state in the low-temperature combustion zone LA can be individually evaluated for each of the injection elements 11, rather than for the entire combustor 2 the evaluation of which is obtained by integrating evaluation results for all the injection elements 11. Namely, it is possible to evaluate the combustion state of the entire combustor 2 by evaluating the combustion states of one injection element 11. Therefore, it is possible to simply evaluate the combustion states in the high-temperature combustion zone and the low-temperature combustion zone in the combustor 2.

Note that, when the injector is constituted by the combination of fuel injection nozzles and oxidizer injection nozzles, which are of like-impingement type, the combustion gas obtained by mixing a fuel and an oxidizer is mixed with a fuel or an oxidizer for dilution, which is injected from nozzles to be subjected to like-impingement. Accordingly, the position for diluting the combustion gas is set to be relatively close to the injector.

On the other hand, in the present embodiment, each of the injection elements 11 constitutes an unlike-impingement type injection element. Furthermore, a configuration is such that the third injection nozzles 17 provided in each of the injection elements 11 inject the fuel or oxidizer for dilution to the dilution point DP further away from the combustion point CP where the oxidizer from the first injection nozzle 13 impinges with the fuel from each of the second injection nozzles 15 to thereby burn.

With this configuration, for each of the injection elements 11, it is possible to arrange, for each of the injection elements 11, the dilution point DP where the fuel or oxidizer for dilution is mixed with the combustion gas to thereby be made to be the low mixture ratio (fuel rich) or the super-high mixture ratio (oxidizer rich), further away from the combustion point CP where a fuel and an oxidizer are mixed and burned. Therefore, in the wide range of the combustion space in the combustor 2, the configuration of diluting the combustion gas with the fuel or oxidizer for dilution can be realized.

Moreover, the dilution of the combustion gas with the fuel or oxidizer for dilution is distributedly and individually carried out at a position away from the injector, for each of the injection elements 11, and thus it is possible to more reliably dilute the combustion gas in the entire injector 1 while securing ignitability in the vicinity of the injector 1.

Furthermore, the present embodiment employs the configuration in which the fuel for dilution or oxidizer for dilution is injected toward the mixture point MP existing on the extended line of the spray fan direction of the impingement jet CJ of a fuel and an oxidizer impinging at the combustion point CP. Therefore, it is possible to cause the fuel for dilution or oxidizer for dilution from the third injection nozzles 17 to efficiently impinge with a directional component of a strong directivity of the impingement jet CJ diffusing by impingement at the combustion point CP, to cause the combustion gas to have a low mixture ratio (fuel rich) or a super-high mixture ratio (oxidizer rich), and accordingly, to uniformly and efficiently achieve a reduction in temperatures of the combustion gas.

As a result, it is possible to efficiently achieve both securement of ignitability and flame-stability in the high-temperature combustion zone HA, and reduction in the temperature of and the uniformity of the combustion gas in the low-temperature combustion zone LA, whereby it is possible to stably supply the low-temperature combustion gas suitable as a driving fluid, to the turbopumps TP1 and TP2.

Note that, in the embodiment described above, the first injection nozzle 13 and the second injection nozzles 15 provided in each of the injection elements 11 employ the unlike-impingement type. However, the first injection nozzle 13 and the second injection nozzles 15 may employ a coaxial type as illustrated in, for example, FIG. 7A which is the elevation view, and in FIG. 7B which is the cross-sectional view taken along the B-B line in FIG. 7A. In the case of the coaxial type, the second injection nozzle 15 is annularly formed with the first injection nozzle 13 being a center thereof.

Figure 7A:
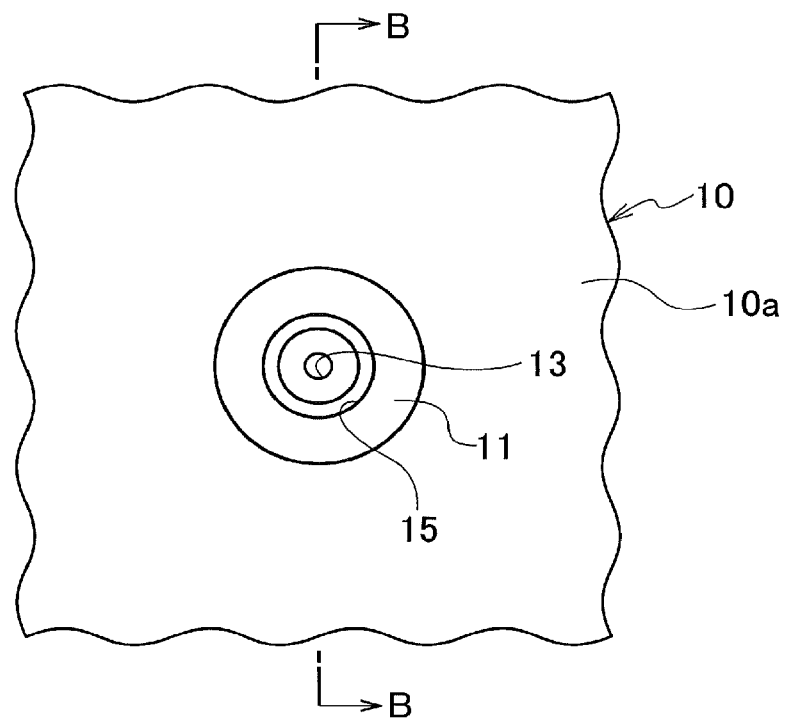
FIG. 7A is an enlarged elevation view illustrating an injection element (co-axial type) used in the injector of the gas generator according to another embodiment of the present disclosure.
Figure 7B:
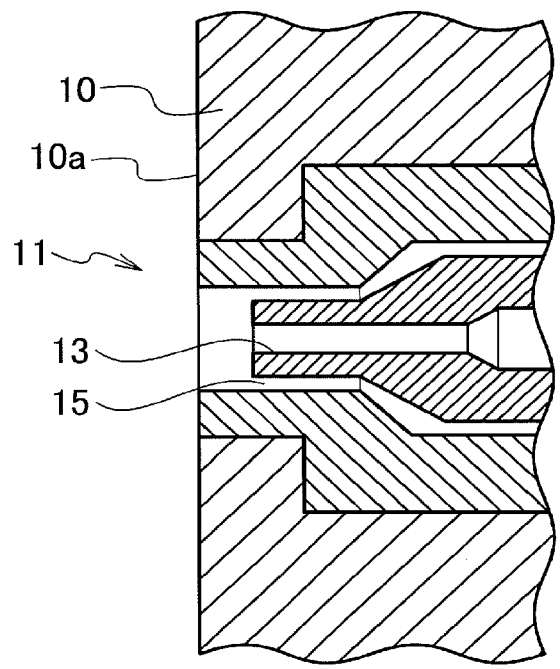
FIG. 7B is a cross-sectional view taken along the B-B line in FIG. 7A.

In this case, although illustration is omitted in FIG. 7A, it may be possible to employ a configuration in which the third injection nozzle 17 is annularly formed similar to the second injection nozzle 15, and is arranged outside of the second injection nozzle 15, or it may be possible to employ a configuration in which a plurality of third injection nozzles 17 is arranged on the circumference of the concentric circle so as to be positioned outside of the circumference of the second injection nozzles 15 as with the injection element 11 of the above-described embodiment illustrated in FIG. 4A.

Furthermore, in the present embodiment, the gas generator (GG) for liquid rocket engines has been described as an example, but the present disclosure is broadly applicable to gas generators in which a fuel and an oxidizer are mixed and burned in a state of being at the low mixture ratio with excess fuel (fuel rich), or in a state of being at the super-high mixture ratio with excess oxidizer (oxidizer rich).

Described below are effects of the present embodiment.

In each of the injection elements, fuel from the fuel injection nozzle for combustion and oxidizer from the oxidizer injection nozzle for combustion are mixed at the combustion point at a mixture ratio in an appropriate range where ignitability and flame-stability are secured, and are burned at high temperatures. The high-temperature combustion gas thus generated is diluted with a fuel or an oxidizer from the injection nozzle for dilution at the dilution point forward further than the combustion point, thereby becoming a low-temperature combustion gas.

Namely, high-temperature combustion of a fuel and an oxidizer mixed at the combustion point at the appropriate mixture ratio, and low-temperature combustion of a combustion gas made to be excess fuel (fuel rich) or excess oxidizer (oxidizer rich) by diluting the high-temperature combustion gas generated through the high-temperature combustion, with a fuel or an oxidizer at the dilution point, are performed in a completed manner in each of the injection elements. Therefore, the combustion state in the high-temperature combustion zone and the combustion state in the low-temperature combustion zone are made individually uniform for each injection element, rather than for each combustor, and further, can be evaluated.

Accordingly, it is possible to evaluate the combustion state of the entire combustor by evaluating the combustion state of one injection element, and it is possible to make further uniform the combustion states in the high-temperature combustion zone and the low-temperature combustion zone, and simply evaluate the combustion states, thereby reducing development cost.

Moreover, a fuel and an oxidizer from the fuel injection nozzle for combustion and the oxidizer injection nozzle for combustion, which are of unlike-impingement type, impinge and are mixed at the combustion point, thereby becoming an impingement jet. The direction of the impingement jet sprayed from the combustion point is determined according to injection directions or injection speeds of a fuel and an oxidizer from the fuel injection nozzle for combustion and the oxidizer injection nozzles for combustion.

Then, at the mixture point existing on the extended line of the spray fan direction of the impingement jet, a fuel or an oxidizer for dilution from the injection nozzle for dilution impinges with the combustion gas in a form of impingement jet, and the combustion gas is diluted with the fuel or the oxidizer to thereby be made to be the low mixture ratio (fuel rich) or the super-high mixture ratio (oxidizer rich). With this configuration, the dilution of the high-temperature combustion gas and the reduction in temperatures of the combustion gas are efficiently carried out.

Therefore, it is possible to efficiently achieve both securement of ignitability and flame-stability in the high-temperature combustion zone, and reduction in the temperature of and the uniformity of the combustion gas in the low-temperature combustion zone, to stably supply the combustion gas to the turbopump in a state of being suitable as a driving fluid for turbines.

What is claimed is:

1. A gas generator, comprising:
   a combustor; and
   an injector connected to the combustor, the injector configured to inject a fuel and an oxidizer toward an inside of the combustor, the injector including a plurality of injection elements arranged at intervals on a same plane of the injector,
   each of the plurality of injection elements including:
      at least one first nozzle formed in a tubular shape having a first axis, the at least one first nozzle configured to inject the oxidizer along the first axis
      at least one second nozzle directed toward a first point on the first axis, the at least one second nozzle configured to inject the fuel to the first point; and
      at least one third nozzle directed toward a second point on the first axis, the at least one third nozzle configured to inject the oxidizer or the fuel to the second point, the second point being located further than the first point from the same plane of the injector.

2. The gas generator according to claim 1, wherein
   the first point is located away from the plane of the injector toward the combustor, and
   the at least one second nozzle has a second axis directed toward the first point and intersecting with the first axis.

3. The gas generator according to claim 1, wherein
   the plurality of injection elements are arranged on concentric circles on the plane.

4. The gas generator according to claim 1, wherein
   the at least one second nozzle comprises a plurality of second nozzles arranged on a first circle around the at least one first nozzle, and
   the at least one third nozzle comprises a plurality of third nozzles arranged on a second circle coaxially arranged with the first circle and located outside the first circle, at positions where extended lines passing the first nozzle and a middle point between adjacent two of the plurality of second nozzles intersect with the second circle.

5. The gas generator according to claim 1, wherein
   the at least one second nozzle is coaxially and annularly formed around the at least one first nozzle.

* * * * *